(12) United States Patent
Satoh et al.

(10) Patent No.: US 9,416,964 B2
(45) Date of Patent: Aug. 16, 2016

(54) COMBUSTION HEATER

(71) Applicants: Kimiyoshi Satoh, Tokyo (JP); Soichiro Kato, Tokyo (JP); Shusaku Yamasaki, Tokyo (JP); Kazuo Miyoshi, Tokyo (JP)

(72) Inventors: Kimiyoshi Satoh, Tokyo (JP); Soichiro Kato, Tokyo (JP); Shusaku Yamasaki, Tokyo (JP); Kazuo Miyoshi, Tokyo (JP)

(73) Assignee: IHI CORPORATION (JP)

(*) Notice: Subject to any disclaimer, the term of this patent is extended or adjusted under 35 U.S.C. 154(b) by 305 days.

(21) Appl. No.: 14/147,680

(22) Filed: Jan. 6, 2014

(65) Prior Publication Data

US 2014/0116423 A1 May 1, 2014

Related U.S. Application Data

(63) Continuation of application No. PCT/JP2012/068580, filed on Jul. 23, 2012.

(30) Foreign Application Priority Data

Jul. 27, 2011 (JP) .................................. 2011-163865

(51) Int. Cl.
*F23D 14/12* (2006.01)
*F23D 14/02* (2006.01)
(Continued)

(52) U.S. Cl.
CPC ............. *F23D 14/125* (2013.01); *F23D 14/02* (2013.01); *F23D 14/06* (2013.01); *F23D 14/66* (2013.01); *F23D 14/70* (2013.01); *F23D 2900/00003* (2013.01)

(58) Field of Classification Search
CPC ......... F23D 14/02; F23D 14/06; F23D 14/66; F23D 14/70; F23D 14/125; F23D 2900/00003
See application file for complete search history.

(56) References Cited

U.S. PATENT DOCUMENTS

| 3,837,329 A | 9/1974 | Mutchler ..................... 126/44 |
| 2003/0232300 A1 | 12/2003 | Maruta et al. ................ 431/328 |
| 2008/0003531 A1 | 1/2008 | Abbasi et al. ................ 431/215 |

FOREIGN PATENT DOCUMENTS

| CN | 1445478 A | 10/2003 |
| CN | 1219997 C | 9/2005 |

(Continued)

OTHER PUBLICATIONS

Search Report dated Dec. 10, 2014 issued in corresponding European Patent Application No. 12816910.9.

(Continued)

*Primary Examiner* — Alfred Basichas
(74) *Attorney, Agent, or Firm* — Ostrolenk Faber LLP

(57) ABSTRACT

A combustion heater (110) provided with a heating plate (126); a placement plate (120) disposed opposite the heating plate; an outer wall (122) provided around the outer circumference of the heating plate and the placement plate; a partitioning plate (124) that is disposed opposite the heating plate and the placement plate inside a space enclosed by the heating plate, the placement plate, and the outer wall, that forms a lead-in portion (134) by a gap with the placement plate, and that forms a lead-out portion (138) by a gap with the heating plate; and a combustion chamber (136) that is arranged in the space enclosed by the heating plate, the placement plate and the outer wall, and at which the fuel gas that was introduced from the lead-in portion combusts, and that leads out exhaust gas produced by the combustion toward the lead-out portion; in which a concavo-convex portion (146) that has concavities and convexities in the thickness direction is provided in the partitioning plate.

24 Claims, 8 Drawing Sheets

(51) Int. Cl.
    *F23D 14/06*     (2006.01)
    *F23D 14/66*     (2006.01)
    *F23D 14/70*     (2006.01)

(56) References Cited

FOREIGN PATENT DOCUMENTS

| | | |
|---|---|---|
| CN | 101825281 A | 9/2010 |
| CN | 101889171 A | 11/2010 |
| EP | 0 486 741 A1 | 5/1992 |
| JP | 54-016827 | 6/1979 |
| JP | 2006-317107 | 11/2006 |
| JP | 2007-093180 | 4/2007 |
| JP | 2007-212082 | 8/2007 |
| JP | 4494346 | 6/2010 |
| TW | 201033546 A1 | 9/2010 |

OTHER PUBLICATIONS

Office Action dated May 4, 2015 in corresponding Chinese Patent Application No. 201280036549.5 with English language translation of Search Report (9 pages).

Taiwanese Office Action, dated Mar. 21, 2014, issued in corresponding Taiwan Patent Application No. 101126584. English translation of Search Report. Total 7 pages.

International Search Report and Written Opinion mailed Sep. 18, 2012 in corresponding PCT International Application No. PCT/JP2012/068580.

Japanese Notice of Allowance, dated Dec. 8, 2015, issued in corresponding Japanese Patent Application No. 2011-163865. Includes English translation. Total 6 pages.

COMBUSTION HEATER

This application is a Continuation of International Application No. PCT/JP2012/068580, filed on Jul. 23, 2012, claiming priority based on Japanese Patent Application No. 2011-163865, filed Jul. 27, 2011, the content of which is incorporated herein by reference in their entity.

TECHNICAL FIELD

The present invention relates to a combustion heater that heats an object to be heated by burning fuel.

Priority is claimed on Japanese Patent Application No. 2011-163865, filed Jul. 27, 2011, the content of which is incorporated herein by reference.

BACKGROUND ART

Gas heaters that heat a radiating body with combustion heat produced by the burning of fuel gas and that heat industrial materials and food and the like with radiating heat from the radiation surface of a radiating body are widely gaining popularity.

In relation to this kind of combustion heater, art has been disclosed that makes a sealed structure from a lead-in passage that guides fuel gas to a combustion chamber and a lead-out passage that guides the exhaust gas burned in the combustion chamber to outside the body, makes the lead-in passage and the lead-out passage adjacent, and increases the thermal efficiency by preheating the fuel gas prior to combustion by the heat of the exhaust gas (for example, refer to Patent Document 1).

PRIOR ART DOCUMENT

Patent Document

[PATENT DOCUMENT 1] Japanese Patent No. 4494346

DISCLOSURE OF THE INVENTION

Problems to be Solved by the Invention

In the combustion heater of Patent Document 1, it is possible to enhance the thermal efficiency by raising the preheating effect of the fuel gas. It is conceivable to raise the preheating effect by enhancing the efficiency of heat transfer from the exhaust gas to the fuel gas by reducing the thickness of the partitioning plate that separates the lead-in passage and the lead-out passage. However, making the partitioning plate thin causes the partitioning plate to undergo thermal deformation and so the lead-in passage and the lead-out passage deform, leading to the problem of the combustion efficiency decreasing due to the inability to uniformly supply fuel gas to the combustion chamber, and not being able to sufficiently discharge the exhaust gas.

The present invention was achieved in view of the above circumstances, and has as its object to provide a combustion heater that can inhibit problems due to thermal deformation, raise the fuel gas preheating effect, and realize a high thermal efficiency.

Means for Solving the Problems

The combustion heater according to the first aspect of the present invention is provided with a heating plate; a placement plate disposed opposite the heating plate; an outer wall provided around the outer circumference of the heating plate and the placement plate; and a partitioning plate that is disposed opposite the heating plate and the placement plate inside a space enclosed by the heating plate, the placement plate, and the outer wall, that forms a lead-in portion by a gap with the placement plate, and that forms a lead-out portion by a gap with the heating plate. The combustion is heater is provided with an in-flow hole, which is provided at the placement plate or the partitioning plate, to which a first pipe portion which guides fuel gas is connected, and which leads the fuel gas from the first pipe portion to the lead-in portion. The combustion heater is provided with a combustion chamber that is arranged in the space enclosed by the heating plate, the placement plate and the outer wall, and at which the fuel gas that was introduced from the lead-in portion combusts, and that leads out exhaust gas produced by the combustion out toward the lead-out portion; and an exhaust hole, which is provided at the heating plate or the partitioning plate, to which a second pipe portion which guides the exhaust gas is connected, and which leads the exhaust gas from the lead-out portion out to the second pipe portion. Also, a concavo-convex portion that has concavities and convexities in the thickness direction is provided in the partitioning plate.

In the combustion heater according to the second aspect of the present invention, ridge portions of the concavo-convex portion in the aforementioned first aspect may make contact with one or both of the heating plate and the placement plate.

In the combustion heater according to the third aspect of the present invention, the concavo-convex portion in the aforementioned first or second aspect may extend in a radial shape from the in-flow hole or the exhaust hole provided in the partitioning plate toward the combustion chamber.

In the combustion heater according to the fourth aspect of the present invention, a flat plate-shaped planar portion may be provided at the lead-in portion side of the partitioning plate in the aforementioned third aspect, in the vicinity of the in-flow hole or the exhaust hole provided in the partitioning plate, and the concavo-convex portion may be provided consecutively with the outer circumferential side of the flat portion.

In the combustion heater according to the fifth aspect of the present invention, the lead-out portion of the aforementioned third or fourth aspect may have a plurality of exhaust flow passages that are partitioned in the circumferential direction by the concavo-convex portion; and the exhaust flow passages may gradually narrow heading from the combustion chamber to the exhaust hole.

In the combustion heater according to the sixth aspect of the present invention, the lead-in portion of any one of the aforementioned third to fifth aspects may have a plurality of lead-in flow passages that are partitioned in the circumferential direction by the concavo-convex portion; and the lead-in flow passages may gradually narrow heading from the in-flow hole to the combustion chamber.

Effects of the Invention

The present invention inhibits problems due to thermal deformation, raises the preheating effect of fuel gas, and can realize a high thermal efficiency.

BEST MODE FOR CARRYING OUT THE INVENTION

Figure 1:
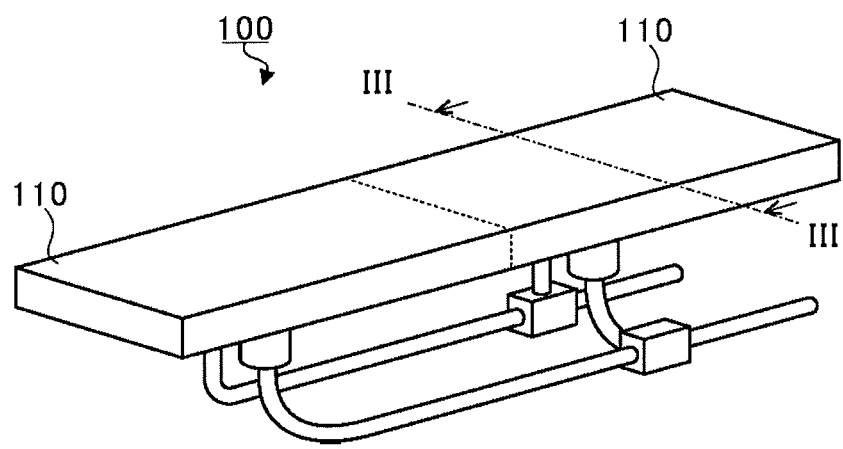
FIG. 1 is a perspective view that shows an example of the external appearance of the combustion heating system in the first embodiment of the present invention.

Hereinbelow, the preferred embodiments of the present invention shall be described in detail while referring to the drawings. The dimensions, materials and other specific figures and the like in the embodiments are merely examples for facilitating understanding of the present invention, and excluding prohibited cases, shall not limit the present invention. Note that in the present embodiments, by giving the same reference numerals to those elements having essentially the same function and constitution, overlapping explanations shall be omitted.

First Embodiment

Combustion Heating System 100

FIG. 1 is a perspective view that shows an example of the external appearance of the combustion heating system 100 in the first embodiment. The combustion heating system 100 in the present embodiment is a premixed-type in which town gas or the like and air that serves as the oxidant gas for combustion are mixed prior to being supplied to the body container. However, the combustion heating system 100 is not limited to this case, and may also be a diffusion-type that performs so-called diffusion combustion.

As shown in FIG. 1, in the combustion heating system 100, a plurality (two being shown in FIG. 1) of combustion heaters 110 are arranged side by side and connected, and upon receiving a supply of a mixed gas (hereinbelow called "fuel gas") consisting of town gas or the like and air, the fuel gas combusts at the respective combustion heaters 110, whereby they are heated. In the combustion heating system 100, the exhaust gas that is produced by that combustion is collected.

Figure 2:
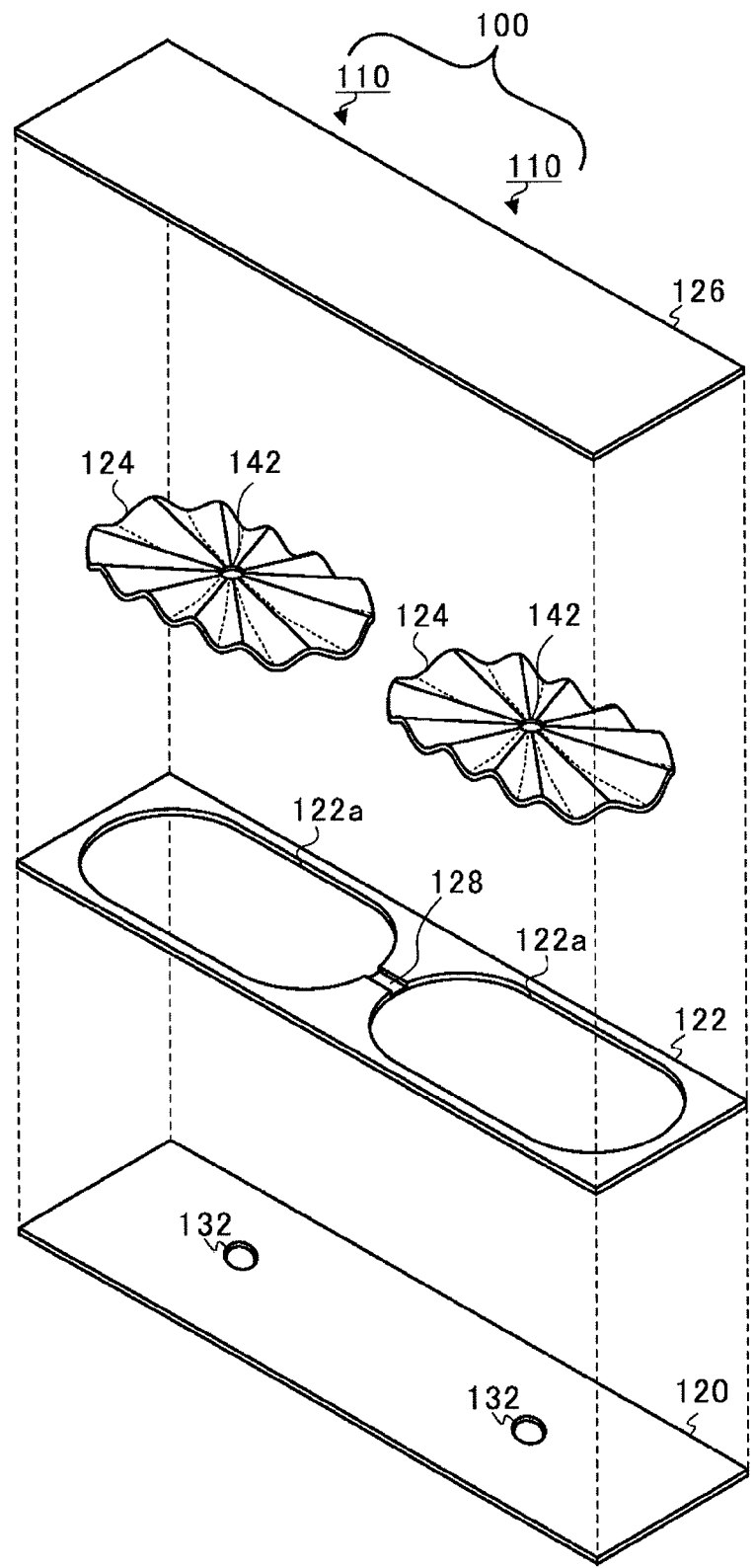
FIG. 2 is a drawing for describing the structure of the combustion heating system in the first embodiment of the present invention.

FIG. 2 is a drawing for describing the structure of the combustion heating system 100 in the first embodiment of the present invention. As shown in FIG. 2, the combustion heating system 100 is provided with a placement plate 120, an outer wall 122, a partitioning plate 124, and a heating plate 126.

The placement plate 120 is a plate-shaped member that is formed by a material with high thermal resistance and oxidation resistance, for example, stainless steel (SUS: Stainless Used Steel) or a material with low thermal conductivity.

The outer wall 122 is constituted by a thin plate-shaped member having an outer shape so as to be positioned coplanar with the outer circumferential surface of the placement plate 120, and is laminated on the placement plate 120. In this outer wall 122, two through-holes 122a that penetrate in the thickness direction (the lamination direction of the outer wall 122 and the placement plate 120) and whose inner circumference has a track shape (a shape consisting of two approximately parallel linear portions and two curves (semicircles) that connect the two linear portions) are provided.

Similarly to the placement plate 120, the partitioning plate 124 is formed by a material with high thermal resistance and oxidation resistance (for example, stainless steel) or a material with high thermal conductivity (for example, brass). The partitioning plate 124 is constituted by a thin plate-shaped member that has an outer shape that follows the inner circumferential surface of the through-hole 122a of the outer wall 122, and is arranged in an approximately parallel manner with the placement plate 120 on the inner side of the outer wall 122. Note that in the state of being housed in the through-hole 122a of the outer wall 122, the partitioning plate 124 is separated from the inner surface of the through-hole 122a by a fixed gap.

The heating plate 126, similarly to the placement plate 120, is constituted from a thin plate-shaped member that is formed by a material with high thermal resistance and oxidation resistance (for example, stainless steel) or a material with high thermal conductivity (for example, brass).

The heating plate 126 has an outer shape such that the outer circumferential surface thereof and the outer circumferential surface of the placement plate 120 and the outer wall 122 are positioned on the same plane, and is laminated on the outer wall 122 and the partitioning plates 124. At this time, the heating plate 126 and the placement plate 120 are oppositely arranged in a mutually parallel manner (virtually parallel in order to cause super-enthalpy combustion in the present embodiment). Also, the outer wall 122 is disposed following the outer circumference of the heating plate 126 and the placement plate 120. The partitioning plates 124 are disposed opposite the heating plate 126 and the placement plate 120 inside a space enclosed by the heating plate 126, the placement plate 120, and the outer wall 122.

If gaps are formed between the placement plate 120, the partitioning plates 124 and the heating plate 126, they may be oppositely arranged in an inclined manner. Also, there is no restriction on the thickness of the placement plate 120, the partitioning plates 124 and the heating plate 126, and moreover they are not limited to flat plates, and may also be formed in a shape in which the thickness varies.

The body container of the combustion heating system 100 is constituted by blocking the top and bottom of the outer wall 122 with the heating plate 126 and the placement plate 120. Moreover, the combined surface area of the top and bottom wall surfaces (the outer surfaces of the heating plate 126 and the placement plate 120) is greater than the surface area of the outer circumferential surface (the outer surface of the outer wall 122). That is to say, the top and bottom wall surfaces occupy the majority of the outer surface of the body container.

Also, the combustion heating system 100 is constituted by connecting two combustion heaters 110 that are arranged side by side, and at the connection region between both combustion heaters 110, a flame transfer portion 128 that is continuous with a sealed space in the connected combustion heaters 110 is formed. However, although referred to as a sealed space, when used in a gas, it is not always necessary to completely seal it. In the combustion heating system 100 of the present embodiment, due to a single ignition by an ignition device such as an igniter (not illustrated), a flame spreads to the combustion heaters 110 that are connected through the flame transfer portion 128 and the combustion heating system 100 is ignited. As described above, two combustion heaters 110 are provided in the combustion heating system 100, but the two combustion heaters 110 have the same constitution. Therefore, hereinbelow one combustion heater 110 shall be described.

Figure 3:
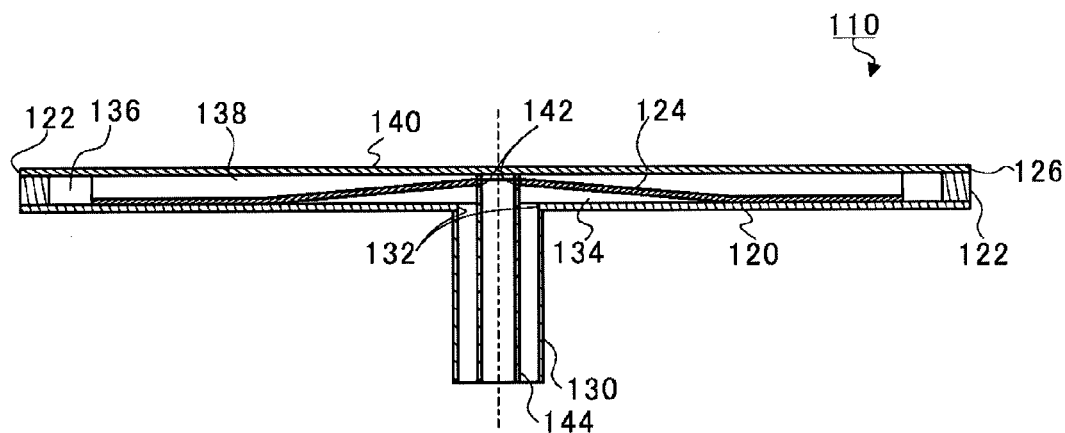
FIG. 3 is a cross-sectional view along the line of FIG. 1.

FIG. 3 is a cross-sectional view along the line of FIG. 1. As shown in FIG. 3, in the placement plate 120, an in-flow hole 132 that penetrates in the thickness direction is provided at the center portion of the combustion heater 110. A first pipe portion 130 through which fuel gas flows is connected to this in-flow hole 132. Fuel gas is guided into the body container of the combustion heater 110 via the in-flow hole 132.

Within the body container, a lead-in portion 134 and a lead-out portion 138 are adjacently formed by being partitioned by the partitioning plate 124. The positional relation of the partitioning plate 124, the lead-in portion 134, and the lead-out portion 138 shall be described below.

The lead-in portion 134 is formed by the gap between the placement plate 120 and the partitioning plate 124, and guides the fuel gas that has flowed in from the in-flow hole 132 in a radial manner to a combustion chamber 136.

The combustion chamber 136 is arranged in a space that is enclosed by the placement plate 120, the heating plate 126, and the outer wall 122. Also, the combustion chamber 136 is arranged along the outer wall 122, facing the outer circumferential end portion of the partitioning plate 124. The ignition device (not illustrated) is provided at an arbitrary position of the combustion chamber 136. Also, in the combustion chamber 136, fuel gas that is introduced from the lead-in portion 134 combusts, and the exhaust gas that is produced by this combustion is led out toward the lead-out portion 138.

The lead-out portion 138 is formed by a gap between the heating plate 126 and the partitioning plate 124, and gathers the exhaust gas that is produced by the combustion in the combustion chamber 136 at the center portion of the combustion heater 110.

As described above, in the body container, the lead-in portion 134 and the lead-out portion 138 are adjacently formed. For that reason, it is possible to transfer the heat of the exhaust gas to the fuel gas through the partitioning plate 124, and thereby preheat the fuel gas.

A radiation surface 140 is a surface on the external side of the heating plate 126, and is heated by the exhaust gas that flows through the lead-out portion 138 and the combustion in the combustion chamber 136, and transmits the radiation heat to an object to be heated.

An exhaust hole 142 that penetrates the center of the combustion heater 110 in the thickness direction is provided in the partitioning plate 124. A second pipe portion 144 is fitted in the inner circumferential portion of this exhaust hole 142. The exhaust gas, after heating the radiation surface 140, is led out to the outside of the combustion heater 110 via the exhaust hole 142.

The second pipe portion 144 is arranged inside of the first pipe portion 130. That is to say, the first pipe portion 130 and the second pipe portion 144 form a double pipe. Also, the second pipe portion 144 has a function of transmitting the heat of the exhaust gas to the fuel gas that flows through the first pipe portion 130.

The region (edge portion) of the placement plate 120 where the in-flow hole 132 is formed is fixed to the end portion of the first pipe portion 130. The exhaust hole 142 of the partitioning plate 124 is fixed to the distal end of the second pipe portion 144 that protrudes out farther than the first pipe portion 130. The placement plate 120 and the partitioning plate 124 are separated by the difference between the distal end of the first pipe portion 130 and the distal end of the second pipe portion 144.

Note that in the present embodiment, the in-flow hole 132 is provided in the placement plate 120, and the exhaust hole 142 is provided in the partitioning plate 124. It is not limited to this, and the in-flow hole 132 may be provided in the partitioning plate 124, and the exhaust hole 142 may be provided in the heating plate 126. In this case, the first pipe portion 130 and the second pipe portion 144 are inserted from the heating plate 126 into the lead-in portion 134 and the lead-out portion 138, and the first pipe portion 130 may be arranged within the second pipe portion 144. Also, the first pipe portion 130 and the second pipe portion 144 may be individually provided. In this case, the in-flow hole 132 may be arranged at either the placement plate 120 or the partitioning plate 124, and the exhaust hole 142 may be arranged at either the heating plate 126 or the partitioning plate 124.

A concavo-convex portion that has concavities and convexities in the thickness direction is provided in the partitioning plate 124 in the present embodiment. Hereinbelow, the structure of the partitioning plate 124 shall be described in detail using FIG. 4A to FIG. 7B.

Figure 4A:
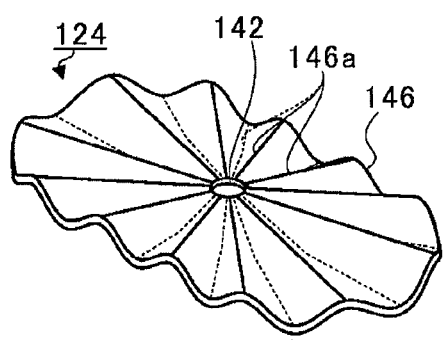
FIG. 4A is a perspective view of the partitioning plate in the first embodiment of the present invention, showing the surface positioned on the lead-out portion side of the partitioning plate.
Figure 4B:
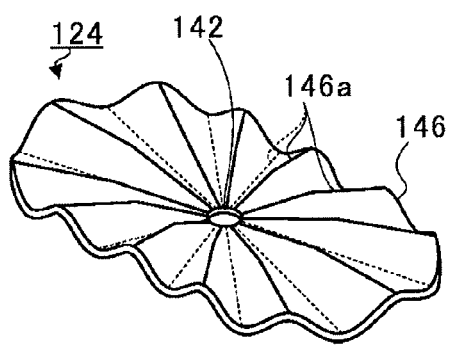
FIG. 4B is a perspective view of the partitioning plate in the first embodiment of the present invention, showing the surface positioned on the lead-in portion side of the partitioning plate.

FIG. 4A and FIG. 4B are perspective drawings of the partitioning plate 124 in the first embodiment. In particular, FIG. 4A shows the surface of the partitioning plate 124 positioned on the lead-out portion 138, while FIG. 4B shows the surface of the partitioning plate 124 positioned on the lead-in portion 134. In FIG. 4A and FIG. 4B, lines extending in a radial shape from the exhaust hole 142 show the ridge portions 146a of the concavo-convex portion 146, with the solid line portions depicting the portions that are convexed, and the dashed line portions depicting the portions that are concaved. The concavo-convex portion 146 extends in a radial shape from the center of the partitioning plate 124 toward the outer circumference of the partitioning plate 24. Note that in FIG. 4A and FIG. 4B, for convenience of the description, the number of the concavo-convexities is described as being a few. It is not limited to this, and as the concavo-convex portion 146, there is no limitation on the number of concavo-convexities.

Figure 5:
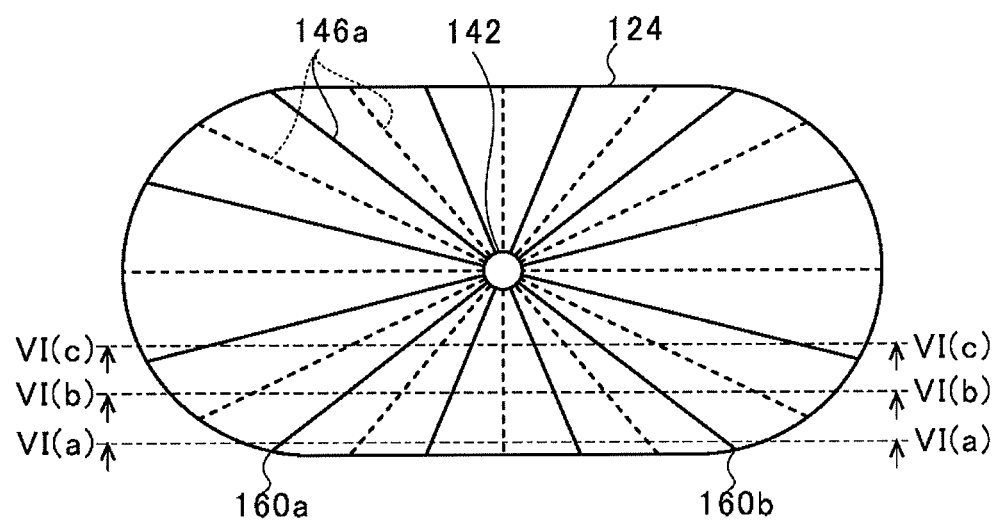
FIG. 5 is a front view of the partitioning plate in the first embodiment of the present invention.
Figure 6A:
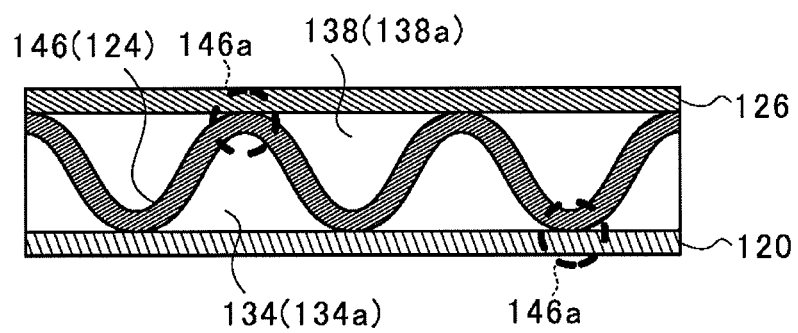
FIG. 6A is a cross-sectional view of the partitioning plate in the first embodiment of the present invention, being a cross-sectional view along the line VI(a)-VI(a) of FIG. 5.
Figure 6B:
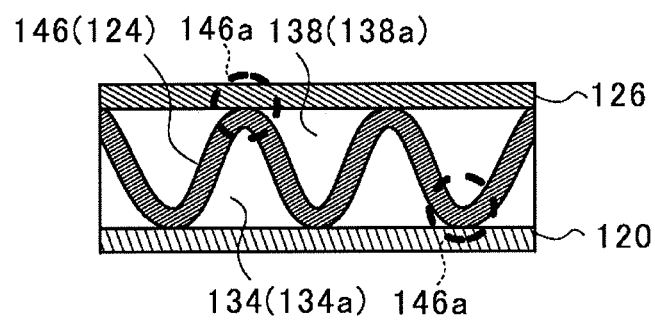
FIG. 6B is a cross-sectional view of the partitioning plate in the first embodiment of the present invention, being a cross-sectional view along the line VI(b)-VI(b) of FIG. 5.
Figure 6C:
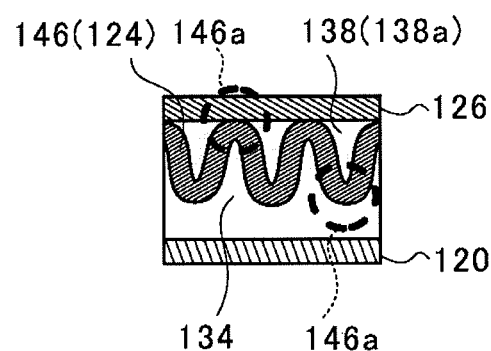
FIG. 6C is a cross-sectional view of the partitioning plate in the first embodiment of the present invention, being a cross-sectional view along the line VI(c)-VI(c) of FIG. 5.

FIG. 5 is a front view that shows the surface of the partitioning plate 124 that is positioned on the lead-out portion 138, and FIG. 6A to FIG. 6C are cross-sectional drawings of the partitioning plate 124. In particular, FIG. 6A is a cross-sectional view along the line VI(a)-VI(a) of FIG. 5, FIG. 6B is a cross-sectional view along the line VI(b)-VI(b) of FIG. 5, and FIG. 6C is a cross-sectional view along the line VI(c)-VI(c) of FIG. 5. However, FIG. 6A to FIG. 6C show only cross-sections of the partitioning plate 124 and the heating plate 126 and the placement plate 120 above and below, in the range from the solid line 160a to the solid line 160b, which show the ridge portions 146a, in FIG. 5.

In FIG. 5, the solid lines that extend in a radial shape from the exhaust hole 142 depict the ridge portions 146a that are convexed on the lead-out portion 138, in the concavo-convex portion 146. In FIG. 5, the dashed lines that extend in a radial shape from the exhaust hole 142 depict the ridge portions 146a that are convexed on the lead-in portion 134, in the concavo-convex portion 146.

As shown in FIG. 6A and FIG. 6B, the ridge portions 146a of the concavo-convex portion 146 (shown by the dashed circles) make contact with both of the heating plate 126 and the placement plate 120 within the range from the combustion chamber 136 side of the partitioning plate 124 to the line VI(b)-VI(b) heading toward the exhaust hole 142.

As shown in FIG. 6C, beyond the line VI(b)-VI(b), the concavo-convexities of the concavo-convex portion 146 gradually become smaller as the exhaust hole 142 is approached. As the concavo-convexities of the concavo-convex portion 146 become smaller, the ridge portions 146a, while maintaining contact with the heating plate 126, separate from the placement plate 120.

As shown in FIG. 6A and FIG. 6B, the combustion chamber 136 side of the lead-in portion 134 (the outer circumferential side of the partitioning plate 124 beyond the line VI(b)-VI(b)) is constituted by a plurality of lead-in flow passages 134a that are partitioned in the circumferential direction by the concavo-convex portion 146. As shown in FIG. 6A to FIG. 6C, in the lead-out portion 138, a plurality of exhaust flow passages 138a that are partitioned in the circumferential direction by the concavo-convex portion 146 are formed from the outer circumferential end of the partitioning plate 124 to the exhaust hole 142.

The lead-in portion 134 is not completely partitioned by the concavo-convex portion 146 in the vicinity of the exhaust hole 142 of the partitioning plate 124 (that is to say, in the vicinity of the in-flow hole 132 of the placement plate 120). The lead-in flow passages 134a are formed at the intermediate position from the in-flow hole 132 to the combustion chamber 136.

Also, the exhaust flow passages 138a gradually narrow from the combustion chamber 136 side of the partitioning plate 124 to the exhaust hole 142.

Figure 7A:
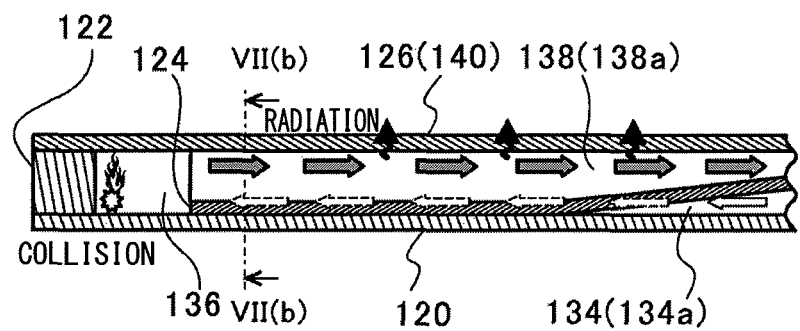
FIG. 7A is a drawing for describing the flow of the fuel gas and the exhaust gas, showing a magnification of a portion of the left side of the cross-sectional view of FIG. 3.
Figure 7B:
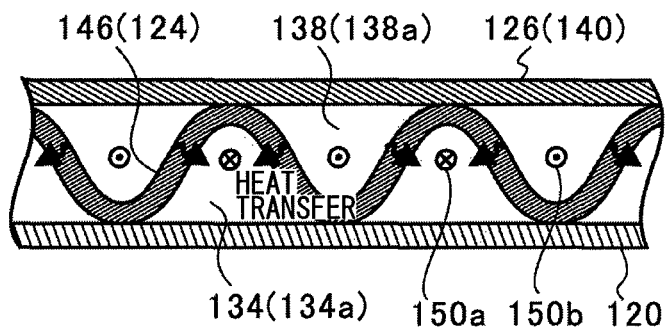
FIG. 7B is a drawing for describing the flow of the fuel gas and the exhaust gas, showing a cross sectional view along the line VII(b)-VII(b) of FIG. 7A.

Next, the flow of the fuel gas and the exhaust gas from the lead-in portion 134 to the lead-out portion 138 shall be described in detail. FIG. 7A and FIG. 7B are drawings for describing the flow of the fuel gas and the exhaust gas. In particular, FIG. 7A shows a magnification of a portion of the left side of the cross-sectional view of FIG. 3, and FIG. 7B shows a cross sectional view along line VII(b)-VII(b) of FIG. 7A. Also, in FIG. 7A, the outlined arrows show the flow of the fuel gas, the grayed-in arrows show the flow of the exhaust gas, and in FIG. 7B, the blacked-in arrows show the movement of heat, the symbol 150a shows the flow direction of the fuel gas, and the symbol 150b shows the flow direction of the exhaust gas. However, in FIG. 7A, the outlined arrows with the dashed lines show the flow of the fuel gas that is hidden by the back side of the partitioning plate 124.

As shown in FIG. 7A and FIG. 7B, the lead-in flow passages 134a and the exhaust flow passages 138a are alternately formed sandwiching the concavo-convex portion 146 of the partitioning plate 124. The fuel gas that has flowed into the lead-in portion 134 flows toward the combustion chamber 136 along the lead-in flow passages 134a.

The fuel gas collides with the outer wall 122 in the combustion chamber 136, whereby its flow rates falls, and after combusting in the combustion chamber 136, becomes high-temperature exhaust gas. The exhaust gas flows through the exhaust flow passages 138a that gradually narrow toward the exhaust hole 142. At this time, the heat of the exhaust gas is transmitted to the radiation surface 140 of the heating plate 126.

Also, as shown in FIG. 7B, the heat of the exhaust gas that passes through the exhaust flow passages 138a is transmitted to the fuel gas that passes through the lead-in flow passages 134a via the concavo-convex portion 146 of the partitioning plate 124. The exhaust gas that flows through the exhaust flow passages 138a and the fuel gas that flows through the lead-in flow passages 134a become counter flows that are arranged side-by-side sandwiching the concavo-convex portion 146 of the partitioning plate 124 (in the counter direction to the heating plate 126 and the placement plate 120). For this reason, it is possible to efficiently preheat the fuel gas with the heat of the exhaust gas, and so it is possible to obtain a high thermal efficiency. By combusting the fuel gas after preheating it (super-enthalpy combustion), it is possible to stabilize the combustion of the fuel gas, and suppress to an extremely low concentration the concentration of CO (carbon monoxide) that is generated by incomplete combustion.

As stated above, in the combustion heater 110 of the present embodiment, thermal deformation of the partitioning plate 124 is absorbed by the concavo-convex portion 146 that is provided in the partitioning plate 124. For this reason, even if the partitioning plate 124 undergoes thermal deformation, it is possible to suppress thermal deformation of the lead-in portion 134 and the lead-out portion 138 due to rattling. Accordingly, in the combustion heater 110, it is possible to reduce the thickness of the partitioning plate 124, and it is possible to raise the fuel gas preheating effect. Also, by providing the concavo-convex portion 146 in the partitioning plate 124, it is possible to increase the surface area in which the fuel gas and the exhaust gas are in contact with the partitioning plate 124. For that reason, the transmission of heat from the exhaust gas to the fuel gas is promoted, and so it is possible to further raise the preheating effect.

Also, since the exhaust flow passages 138a narrow toward the exhaust hole 142, the flow rate of the exhaust gas is increased, and the heat transfer coefficient from the exhaust gas to the heating plate 126 and the partitioning plate 124 increases. For that reason, the combustion heater 110 can raise the heating effect of the radiation surface 140 and the fuel gas preheating effect.

Also, since the ridge portions 146a of the concavo-convex portion 146 are in contact with the heating plate 126 and the placement plate 120, the partitioning plate 124 is fixed in the combustion heater 110, and so it is possible to further inhibit rattling due to thermal deformation of the partitioning plate 124. For that reason, it is possible to further reduce the thickness of the partitioning plate 124, and so it is possible to raise the fuel gas preheating effect.

Also, in the vicinity of the in-flow hole 132 of the partitioning plate 124, the concavities and convexities of the concavo-convex portion 146 become smaller and come to be in contact only with the heating plate 126, and thus do not narrow the flow passages of the lead-in portion 134. For that reason, even if thermal deformation arises in the partitioning plate 124 due to use over an extended period, it is possible to inhibit variations in the supply amount of the fuel gas in the circumferential direction due to narrowing of the flow passages of the lead-in portion 134 in the vicinity of the in-flow hole 132.

Second Embodiment

Next, the partitioning plate 224 in the second embodiment shall be described. In the second embodiment, the partitioning plate 224 differs compared to the aforementioned first embodiment. Accordingly, descriptions of constitutions that are the same as the first embodiment shall be omitted, and only the partitioning plate 224 with the differing constitution shall be described.

Figure 8A:
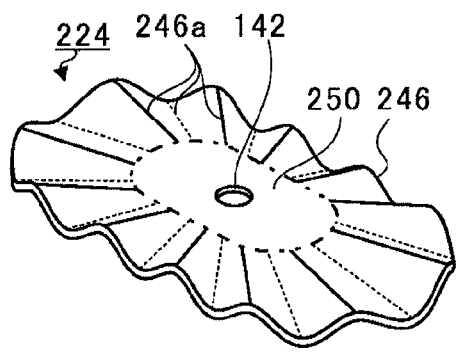
FIG. 8A is a perspective view of the partitioning plate in the second embodiment of the present invention, showing the surface positioned on the lead-out portion side of the partitioning plate.
Figure 8B:
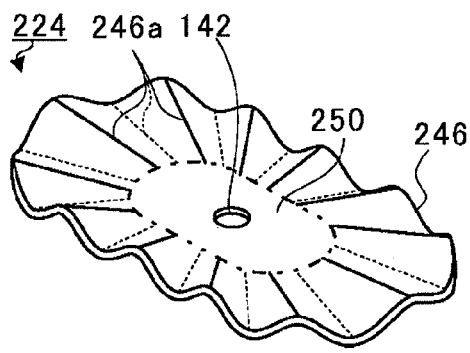
FIG. 8B is a perspective view of the partitioning plate in the second embodiment of the present invention, showing the surface positioned on the lead-in portion side of the partitioning plate.

FIG. 8A and FIG. 8B are perspective views of the partitioning plate 224 in the second embodiment. In particular, FIG. 8A shows the surface of the partitioning plate 224 positioned on the lead-out portion 138, and FIG. 8B shows the surface of the partitioning plate 224 positioned on the lead-in portion 134.

In the partitioning plate 224, a plate-shaped planar portion 250 is provided over a fixed range in the vicinity of the center. A concavo-convex portion 246 and ridge portions 246a thereof are continuously provided on the outer circumferential side of the planar portion 250. As shown in FIG. 8A and FIG. 8B, the solid lines denote convex ridge portions 246a, while the dashed lines denote concave ridge portions 246a.

In the event of the lead-in flow passages 134a being partitioned and formed by the ridge portions 246a of the concavo-convex portion 246 making contact with the placement plate 120 even in the vicinity of the in-flow hole 132 of the in-flow portion 134, thermal deformation occurs in the partitioning plate 224 due to long-term use. Thereby, there is a possibility of the vicinity of the in-flow hole 132 narrowing extremely, and variations arising in the supply amount of the fuel gas in the circumferential direction. In the first embodiment, the above possibility is avoided by making the concavities and convexities of the concavo-convex portion 146 small. In the present embodiment, the planar portion 250 is provided in the partitioning plate 224 to ensure that the spacing (height) of the lead-in portion 134 in the vicinity of the center is constant with respect to the circumferential direction. For this reason, it is possible to further inhibit variations in the supply amount of fuel gas in the circumferential direction.

Third Embodiment

Next, a partitioning plate 324 in the third embodiment shall be described. In the third embodiment, the partitioning plate 324 differs compared to the aforementioned first embodiment. Accordingly, descriptions of constitutions that are the same as the aforementioned first embodiment shall be omitted, and only the partitioning plate 324 with the differing constitution shall be described.

Figure 9:
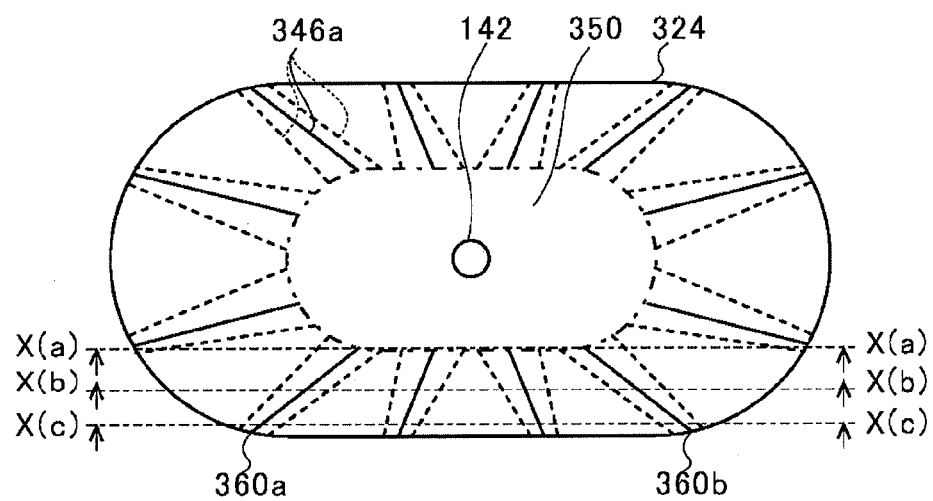
FIG. 9 is a front view of the partitioning plate in the third embodiment of the present invention.
Figure 10A:
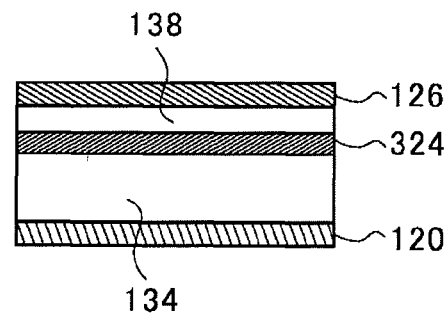
FIG. 10A is a cross-sectional view of the partitioning plate in the third embodiment of the present invention, being a cross-sectional view along line X(a)-X(a) of FIG. 9.
Figure 10B:
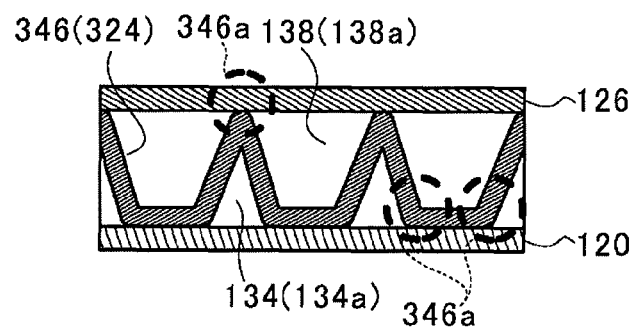
FIG. 10B is a cross-sectional view of the partitioning plate in the third embodiment of the present invention, being a cross-sectional view along line X(b)-X(b) of FIG. 9.
Figure 10C:
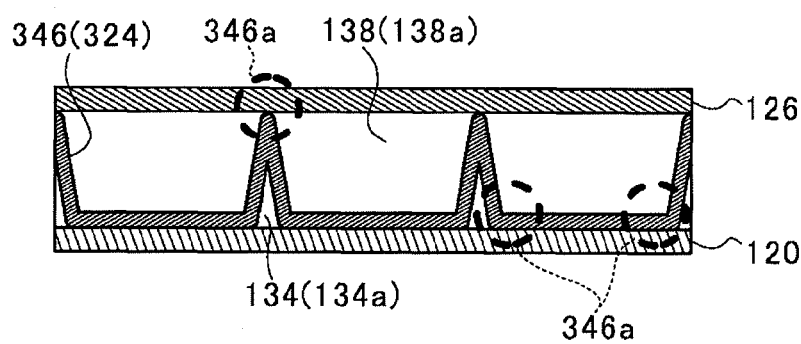
FIG. 10C is a cross-sectional view of the partitioning plate in the third embodiment of the present invention, being a cross-sectional view along line X(c)-X(c) of FIG. 9.

FIG. 9 is a front view of the partitioning plate 324 in the third embodiment, and FIG. 10A to FIG. 10C are cross-sectional views of the partitioning plate 324 in the third embodiment. In particular, FIG. 10A is a cross-sectional view along line X(a)-X(a) of FIG. 9, FIG. 10B is a cross-sectional view along line X(b)-X(b) of FIG. 9, and FIG. 10C is a cross-sectional view along line X(c)-X(c) of FIG. 9. Also, FIG. 10A to FIG. 10C show only the cross-section of the partitioning plate 324 and the heating plate 126 and the placement plate 120 above and below, being cross sections in the range from the solid line 360a to the solid line 360b in FIG. 9 that denote the ridge portions 346a.

In FIG. 9, similarly to FIG. 5, the solid lines that extend in a radial shape from the exhaust hole 142 show the ridge portions 346a that are convexed on the lead-out portion 138, among the concavo-convex portion 346. In FIG. 9, the dashed lines that extend in a radial shape from the exhaust hole 142 show the ridge portions 346a that are convexed on the lead-in portion 134, among the concavo-convex portion 346. Note that as shown in FIG. 10B and FIG. 10C, among the concavo-convex portion 346, the regions that are convexed on the lead-in portion 134 become surfaces, and the end portions of each surface are made to serve as ridge portions 346a on the lead-in portion 134 (in FIG. 10B and FIG. 10C, the ridge portions 346a are shown by dashed circles).

As shown in FIG. 10A, at the planar portion 350 of the partitioning plate 324, since there are no concavities and convexities, the lead-in flow passages 134a are not partitioned and formed at the lead-in portion 134. As shown in FIG. 10B and FIG. 10C, heading from the in-flow hole 132 to the combustion chamber 136, the height (depth) of the concavo-convex portion 346 gradually increases, and the ridge portions 346a of the concavo-convex portion 346 make contact with the placement plate 120 and the heating plate 126. Thereby, the lead-in flow passages 134a and the exhaust flow passages 138a are formed.

The lead-in flow passages 134a become gradually narrower heading from the in-flow hole 132 to the combustion chamber 136, as shown in FIG. 10B and FIG. 10C.

Due to the lead-in flow passages 134a becoming narrow heading to the outer circumference, it is possible to prevent back-firing. Also, since the lead-in flow passages 134a are large in the vicinity of the center, in the same manner as the aforementioned, the flow passages do not narrow excessively even if thermal deformation occurs in the partitioning plate 324 due to long-term use. For that reason, variations in the supply amount of the fuel gas in the circumferential direction of the combustion heaters 110 are hindered from arising.

In the second embodiment and the third embodiment described above, it is possible to realize the same operation and effect as the abovementioned first embodiment. That is to say, thermal deformation of the partitioning plate 224, 324 is absorbed and inhibited by the concavo-convex portion 246, 346 that is provided in the partitioning plate 224, 324. For this reason, it is possible to reduce the thickness of the partitioning plate 224, 324, and so it becomes possible to increase the fuel gas preheating effect. Also, the surface area at which the fuel gas and the exhaust gas are in contact with the partitioning plate 224, 324 increases due to the concavo-convex portion 246, 346. For this reason, the transmission of heat from the exhaust gas to the fuel gas is promoted, and so the preheating effect further rises.

Note that the partitioning plate is not limited to for example a corrugated plate or the like in which concavities and convexities smoothly bulge, and concavities and convexities may be formed by bending in arbitrary directions. Also, the orientation of the concavo-convex portion is not limited to a radial shape, and may also be a roll shape, or may be formed in arbitrary orientations. In addition, the ridge portions of the concavo-convex portion may not make contact with either of the heating plate 126 and the placement plate 120.

Also, in the embodiments described above, the combustion chamber 136 is formed along the outer wall 122, but it is not limited to this case. The combustion chamber 136 need only be in a space that is enclosed by the outer wall 122, the heating plate 126 and the placement plate 120. However, in order to sufficiently secure the fuel gas preheating effect by the exhaust gas, it is preferable that the combustion chamber 136 be provided at any position in the space from the intermediate position between the in-flow hole 132 provided in the placement plate 120 and the outer wall 122 to the vicinity of the outer wall 122, among the space between the heating plate 126 and the partitioning plate, or the space between the partitioning plate and the placement plate 120.

Also, in the embodiments described above, the combustion heating system 100 that connects two combustion burners 110 was given as an example, but it is not limited to this case. The combustion heater 110 may be used alone, and not in the combustion heating system 100.

Hereinabove, preferred embodiments of the present invention were described while referring to the drawings, but the present invention is not limited to the embodiments. It is clear that a person skilled in the art in that technical field could conceive various modifications and amendments within the scope disclosed in the claims, and they are also understood to belong to the technical scope of the present invention.

INDUSTRIAL APPLICABILITY

The combustion heater of the present invention, by suppressing inconveniences due to thermal deformation, can raise the fuel gas preheating effect, and obtain a combustion heater that is capable of realizing a high thermal efficiency.

DESCRIPTION OF THE REFERENCE NUMERALS

110: combustion heater
120: placement plate
122: outer wall
124, 224, 324: partitioning plate
126: heating plate
134: lead-in portion
134*a*: lead-in flow passage
136: combustion chamber
138: lead-out portion
138*a*: exhaust flow passage
146, 246, 346: concavo-convex portion
146*a*, 246*a*, 346*a*: ridge portion
250, 350: planar portion

The invention claimed is:
1. A combustion heater comprising:
a heating plate;
a placement plate disposed opposite the heating plate;
an outer wall provided around the outer circumference of the heating plate and the placement plate;
a partitioning plate that is disposed between and opposite the heating plate and the placement plate, the partitioning plate having a thickness direction in a direction between the heating plate and the placement plate;
the partitioning plate being disposed inside a space enclosed by the heating plate, the placement plate, and the outer wall, that forms a lead-in portion by a gap with the placement plate, and that forms a lead-out portion by a gap with the heating plate;
an in-flow hole, which is provided at the placement plate or the partitioning plate, to which a first pipe portion which guides fuel gas is connected, and which leads the fuel gas from the first pipe portion to the lead-in portion;
a combustion chamber that is arranged in the space enclosed by the heating plate, the placement plate and the outer wall, and at which the fuel gas that was introduced from the lead-in portion combusts, and that leads out exhaust gas produced by the combustion toward the lead-out portion; and
an exhaust hole, which is provided at the heating plate or the partitioning plate, to which a second pipe portion which guides the exhaust gas is connected, and which leads the exhaust gas from the lead-out portion out to the second pipe portion;
wherein the partitioning plate includes a corrugated plate-shaped concavo-convex portion having concavities and convexities projecting in the thickness direction of the partitioning plate.

2. The combustion heater according to claim 1, further comprising ridge portions of the concavo-convex portion make contact with one or both of the heating plate and the placement plate.

3. The combustion heater according to claim 2, wherein a plate-shaped planar portion is provided at the lead-in portion side of the partitioning plate, in the vicinity of the in-flow hole or the exhaust hole provided in the partitioning plate, and
the concavo-convex portion is provided consecutively with the outer circumferential side of the planar portion.

4. The combustion heater according to claim 2, wherein the lead-out portion has a plurality of exhaust flow passages that are partitioned in the circumferential direction by the concavo-convex portion; and
the exhaust flow passages gradually narrow heading from the combustion chamber to the exhaust hole.

5. The combustion heater according to claim 2, wherein the lead-in portion has a plurality of lead-in flow passages that are partitioned in the circumferential direction by the concavo-convex portion; and the lead-in flow passages gradually narrow heading from the in-flow hole to the combustion chamber.

6. The combustion heater according to claim 2, wherein the concavo-convex portion extends in a radial shape from the in-flow hole or the exhaust hole provided in the partitioning plate toward the combustion chamber.

7. The combustion heater according to claim 6, wherein the lead-out portion has a plurality of exhaust flow passages that are partitioned in the circumferential direction by the concavo-convex portion; and
the exhaust flow passages gradually narrow heading from the combustion chamber to the exhaust hole.

8. The combustion heater according to claim 6, wherein the lead-in portion has a plurality of lead-in flow passages that are partitioned in the circumferential direction by the concavo-convex portion; and the lead-in flow passages gradually narrow heading from the in-flow hole to the combustion chamber.

9. The combustion heater according to claim 6, wherein a plate-shaped planar portion is provided at the lead-in portion side of the partitioning plate, in the vicinity of the in-flow hole or the exhaust hole provided in the partitioning plate, and
the concavo-convex portion is provided consecutively with the outer circumferential side of the planar portion.

10. The combustion heater according to claim 9, wherein the lead-out portion has a plurality of exhaust flow passages that are partitioned in the circumferential direction by the concavo-convex portion; and
the exhaust flow passages gradually narrow heading from the combustion chamber to the exhaust hole.

11. The combustion heater according to claim 9, wherein the lead-in portion has a plurality of lead-in flow passages that are partitioned in the circumferential direction by the concavo-convex portion; and the lead-in flow passages gradually narrow heading from the in-flow hole to the combustion chamber.

12. The combustion heater according to claim 1, wherein the concavo-convex portion extends in a radial shape from the in-flow hole or the exhaust hole provided in the partitioning plate toward the combustion chamber.

13. The combustion heater according to claim 12, wherein the lead-out portion has a plurality of exhaust flow passages that are partitioned in the circumferential direction by the concavo-convex portion; and
the exhaust flow passages gradually narrow heading from the combustion chamber to the exhaust hole.

14. The combustion heater according to claim 12, wherein the lead-in portion has a plurality of lead-in flow passages that are partitioned in the circumferential direction by the concavo-convex portion; and the lead-in flow passages gradually narrow heading from the in-flow hole to the combustion chamber.

15. The combustion heater according to claim 12, wherein the concavities and convexities extend in respective radial directions from the in-flow hole or the exhaust hole provided in the partitioning plate and extend toward or away from the combustion chamber.

16. The combustion heater according to claim 15, further comprising flow passages defined by the concavities and the convexities, and the flow passages gradually narrow between the combustion chamber and one of the in-flow hole and the exhaust hole.

17. The combustion heater according to claim 12, wherein a plate-shaped planar portion is provided at the lead-in portion side of the partitioning plate, in the vicinity of the in-flow hole or the exhaust hole provided in the partitioning plate, and
the concavo-convex portion is provided consecutively with the outer circumferential side of the planar portion.

18. The combustion heater according to claim 17, wherein the lead-out portion has a plurality of exhaust flow passages that are partitioned in the circumferential direction by the concavo-convex portion; and
the exhaust flow passages gradually narrow heading from the combustion chamber to the exhaust hole.

19. The combustion heater according to claim 17, wherein the lead-in portion has a plurality of lead-in flow passages that are partitioned in the circumferential direction by the concavo-convex portion; and the lead-in flow passages gradually narrow heading from the in-flow hole to the combustion chamber.

20. The combustion heater according to claim 1, wherein the lead-in portion has a plurality of lead-in flow passages that are partitioned in the circumferential direction by the concavo-convex portion; and the lead-in flow passages gradually narrow heading from the in-flow hole to the combustion chamber.

21. The combustion heater according to claim 1, wherein a plate-shaped planar portion is provided at the lead-in portion side of the partitioning plate, in the vicinity of the in-flow hole or the exhaust hole provided in the partitioning plate, and
the concavo-convex portion is provided consecutively with the outer circumferential side of the planar portion.

22. The combustion heater according to claim 1, wherein the lead-out portion has a plurality of exhaust flow passages that are partitioned in the circumferential direction by the concavo-convex portion; and
the exhaust flow passages gradually narrow heading from the combustion chamber to the exhaust hole.

23. The combustion heater according to claim 1, wherein the concavities and convexities extend in a direction from the lead-in portion to the outer wall.

24. The combustion heater according to claim 23, wherein there are a plurality of separate concavities and convexities extending over the entire corrugated plate-shaped, concavo-convex portion.

* * * * *